United States Patent [19]

Kiibler et al.

[11] Patent Number: 5,691,414

[45] Date of Patent: Nov. 25, 1997

[54] SOLVENT-FREE PROCESS FOR MAKING UV CURABLE ADHESIVES AND SEALANTS FROM EPOXIDIZED MONOHYDROXYLATED DIENE POLYMERS

[75] Inventors: Kathleen Suzanne Kiibler, Katy; Jeffrey George Southwick, Houston, both of Tex.

[73] Assignee: Shell Oil Company, Houston, Tex.

[21] Appl. No.: 665,071

[22] Filed: Jun. 11, 1996

Related U.S. Application Data

[60] Provisional application No. 60/000,268, Jun. 16, 1995.
[51] Int. Cl.[6] ....................................................... C08L 53/02
[52] U.S. Cl. ................................................ 525/99; 525/93
[58] Field of Search ............................................. 525/99, 93

[56] References Cited

U.S. PATENT DOCUMENTS 5,393,818  2/1995  Masse et al. ............................. 524/270
5,500,481  3/1996  St. Clair ................................. 525/92 K

FOREIGN PATENT DOCUMENTS 0516203  2/1992  European Pat. Off. .

OTHER PUBLICATIONS

"Liquid Reactive Polymers for Radiation Curable High Performance PSA's" by J. R. Erickson, E. M. Zimmermann, J. G. Southwick, and K. S. Kiibler, 1995 Hot Melt Symposium, Jun. 18, 1995.

*Primary Examiner*—Robert E. Sellers
*Attorney, Agent, or Firm*—Donald F. Haas

[57] ABSTRACT

The invention herein is a solvent free process for producing UV curable adhesive and sealant compositions comprising a monool, tackifying resin, and a monohydroxylated epoxidized polydiene polymer which is comprised of at least two polymerizable ethenically unsaturated hydrocarbon monomers wherein at least one is a diene monomer which yields unsaturation suitable for epoxidation and wherein the polymer contains from 0.1 to 7.0 milliequivalents of epoxy per gram of polymer. The process involves predispersing an insoluble photoinitiator in a component of the formulation with which it is more compatible than with the tackifying resin, and then adding the tackifying resin to the predispersion.

10 Claims, No Drawings

5,691,414

SOLVENT-FREE PROCESS FOR MAKING UV CURABLE ADHESIVES AND SEALANTS FROM EPOXIDIZED MONOHYDROXYLATED DIENE POLYMERS

REFERENCE TO PROVISIONAL APPLICATION

This application claims the benefit of U.S. Provisional Application No. 60/000,268, filed Jun. 16, 1995.

BACKGROUND OF THE INVENTION

This invention relates to a new process for making adhesives and sealants made from monohydroxylated diene polymers. More specifically, the invention relates to a solvent free process for making UV curable adhesives and sealants from epoxidized monohydroxylated polydiene polymers which does not require the use of intensive mixing equipment.

The use of novel epoxidized monohydroxylated polydienes in UV curable adhesive and sealants compositions is described in copending commonly assigned U.S. patent application Ser. No. 08/320,804, filed Oct. 11, 1994, pending. The polymers are combined with other ingredients such as a tackifying resin to make them suitable for adhesive and sealant products. A photoinitiator is included in the combination to promote the UV curing (crosslinking) of the composition. As described in the Examples of the aforesaid patent application, the components were dispersed in a solvent, usually THF, and then adhesive films were cast from the solution. The solvent was necessary because difficulties were encountered in mixing the photoinitiator (bis (dodecylphenyl)iodonium hexafluoroantimonate) into the adhesive mixture because it was not readily compatible and would not evenly disperse. The THF was necessary to obtain effective UV curing—the curing was ineffective in the absence of the solvent.

For many applications, the use of solvents is undesirable because of environmental hazards and the cost of solvent removal and the solvent itself. Copending, commonly assigned U.S. patent application Ser. No. 08/638,476, filed Apr. 26, 1996, pending, with the same title, discloses a solvent free method for mixing these components which requires the use of intensive mixing equipment. The invention described herein provides a solvent free process for dispersing the insoluble photoinitiator so that an effectively cured adhesive or sealant is produced without these problems and without the necessity of using intensive mixing equipment.

SUMMARY OF THE INVENTION

This invention is a process for making UV curable adhesive and sealant compositions wherein an epoxidized monohydroxylated polydiene polymer comprised of at least two polymerizable ethenically unsaturated hydrocarbon monomers wherein at least one is a diene monomer which yields unsaturation suitable for epoxidation is used as the binder for the composition. The preferred epoxidized monohydroxylated polymers are block copolymers of at least two conjugated dienes, preferably isoprene and butadiene, and optionally, a vinyl aromatic hydrocarbon wherein a hydroxyl group is attached at one end of the polymer molecule. These polymers may be hydrogenated or unhydrogenated. The adhesive or sealant composition comprises this polymer, a low molecular weight polydiene monool, and a suitable tackifying resin.

The present process of incorporating into the composition of the above polymer, the diene mono-ol, and tackifying resin a photoinitiator which is insoluble in the adhesive formulation, such as a triaryl sulfonium salt, overcomes the difficulty in mixing the photoinitiator with the adhesive formulation. When mixed into the adhesive formulation, the photoinitiator forms large droplets and poor curing with UV radiation is the result. This problem is overcome by predispersing the photoinitiator into a more chemically compatible (more compatible than the tackifying resin) component or components of the formulation, and then mixing with the rest of the formulation ingredients, i.e., the tackifying resin. In the prior art, this predispersing would be carried out in a solvent. In the present invention, one of the components of the composition is used as the bulk phase for the fine droplet dispersion of photoinitiator. In the preferred embodiment, the mono-ol (because it will usually be the lowest viscosity material in the composition to start) is heated, if necessary, to lower its viscosity, and then the photoinitiator is added and the predispersion is agitated, but not intensively agitated.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, silanolates, napthalides, biphenyls or anthracenyl derivatives. The monohydroxylated polydienes are synthesized by anionic polymerization of conjugated diene hydrocarbons with these lithium initiators. This process is well known as described in U.S. Pat. Nos. 4,039,593 and Re. 27,145 which descriptions are incorporated herein by reference. Polymerization commences with a monolithium initiator which builds a living polymer backbone at each lithium site. Specific processes for making these polymers are described in detail in copending, commonly assigned application Ser. No. 08/320,807, "Monohydroxylated Diene Polymers and Epoxidized Derivatives Thereof", filed Oct. 11, 1994, pending, which is herein incorporated by reference.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl naphthalene, alkyl-substituted vinyl napthalenes and the like.

The most preferred monohydroxylated polydiene polymer of the present invention has the structural formula $$(HO)_x\text{---}A\text{---}S_z\text{---}B\text{---}(OH)_y \qquad (I)$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000. S is a vinyl aromatic hydrocarbon block which may have a molecular weight of from 100 to 10,000. x mind y are 0 or 1. Either x or y must be 1, but only one at a time can be 1. z is 0 or 1. Either the A or the B block may be capped with a miniblock of polymer, 50 to 1000 molecular weight, of a different composition, to compensate for any initiation, tapering due to unfavorable copolymerization rates, or capping difficulties. These polymers may be epoxidized such that they contain from 0.1 to 7.0 milliequivalents (meq) of epoxy per gram of polymer.

Diblocks falling within the above description are preferred. The overall molecular weight of such diblocks may range from 1500 to 15000, preferably 3000 to 7000. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

I—B—OH  I—B/S—OH  I/S—B—OH  I—I/B—OH or
B/I—B/S—OH  B—B/S—OH  I—EB—OH  I—BB/S—OH or
I—S/EB—OH  I/S—EB—OH  HO—I—S/B  HO—I—S/EB where EB is hydrogenated butadiene, —EB/S—OH means that the hydroxyl source is attached to a styrene mer, and —S/EB—OH signifies that the hydroxyl source is attached to a hydrogenated butadiene mer. This latter case, —S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

I—EB/S—EB—OH  I—B/S—B—OH  I—S—EB—OH
I—S—B—OH or
I—I/S—I—OH  I—S—I—OH  B—S—B—OH  B—B/S—B—OH or

I—B/S—I—OH  I—EB/S—I—OH or
I—B—S—OH  I—EB—S—OH  HO—I—EB—S.

The latter group of polymers specified in the last line above wherein the styrene block is external are represented by the formula $$(HO)_x\text{—}A\text{—}B\text{—}S\text{—}(OH)_y \qquad (II)$$

where A, B, S, x, and y are as described above. These polymers and the other triblocks shown above are particularly advantageous for introducing blocks of epoxy functionality into the monohydroxylated polymers at multiple sites.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. These and other methods are described in more detail in U.S. Pat. Nos. 5,229,464 and 5,247,026 which are herein incorporated by reference. The amount of epoxidation of these polydiene polymers ranges from about 0.1 to about 7 milliequivalents of epoxide per gram of polymer, Low levels are desirable to avoid overcure. Above 7 meq/g, the rigidity, crosslink density, cost, difficulty of manufacture, and polarity of the polymer (so as to not accept certain monohydroxy diene polymer) without any benefit. The preferred amount of epoxidation is about 0.5 to about 5 meq/g and the most preferred amount of epoxidation is about 1.0 to 3 meq/g. The most preferred amount best balances rate of cure against overcure and better maintains compatibility with a variety of formulating ingredients commonly used with polydiene based adhesives.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

If desired, these block copolymers can be partially hydrogenated. Hydrogenation may be effected selectively as disclosed in U.S. Pat. Reissue No. 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference. Partially unsaturated hydroxylated polymers are useful for further functionalization to make the epoxidized polymers of this invention. The partial unsaturation preferably is such that 0.1 to 7 meq of aliphatic double bonds suitable for epoxidation remain on the polymer. If epoxidation is done before hydrogenation, then it is preferred that all remaining aliphatic double bonds be hydrogenated.

It is highly advantageous to include in the composition a low molecular weight polydiene mono-ol in order to improve the tack of the adhesive. Such mono-ols have a molecular weight of 2000 to 30,000 and are preferably hydrogenated polydiene polymers with a terminal OH, such as monohydroxylated hydrogenated polybutadiene or polyisoprene. Preferred mono-ols include those with a molecular weight range of 2000 to 10,000.

The binders of this invention may be cured by cationic means using acid catalysts but are preferably cured by means of ultraviolet or electron beam radiation. Radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used. A complete description of how this irradiation may be accomplished is found in commonly assigned U.S. Pat. No. 5,229,464 which is herein incorporated by reference.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, dialkyl-4-hydroxylphenylsulfonium salts. The anions in these salts generally possess low nucleophilic character and include $SbF_6^-$, $BF_4^-$, $PF_6^-$, $AsF_6^-$, and $B(C_6F_5)_4^-$ (tetrakis (pentafluorophenyl)borate). Specific examples include (4-octyloxyphenyl)-phenyliodonium hexafluoroantimonate, UVI-6990 (from Union Carbide), FX-512 (3M Company)., and SILCOLEASE UV200CATA photoinitiators (Rhone-Poulenc Chemie). Bis(dodecylphenyl)iodonium hexafluoroantimonate, UV 9310 (GE), and, UVI-6974 (Union Carbide), are especially effective. The onium salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. If possible, the photoinitiator and photosensitizer are chosen to be compatible with the polymer/formulation being crosslinked and the light source available. When this is not possible and the photoinitiator is insoluble in the formulation, the photoinitiator can be adequately dispersed into the formulation using the method described herein.

As described in the examples of copending, commonly assigned U.S. patent application Ser. No. 08/320,804, filed Oct. 11, 1994, pending, an insoluble photoinitiator can be dispersed in a solvent along with the polymer and the tackifying resin in order to provide a composition which is effectively radiation curable. The present process accomplishes this without a solvent. One or more of the primary components of the composition which is more chemically compatible with the photoinitiator are used to form a pre-dispersion of the photoinitiator. The photoinitiator is added to the more compatible component(s) and thoroughly mixed, but high shear conditions are not necessary. This may require mild heating of the dispersing component(s). Then the other components are added. Surprisingly, it has been found that this process provides much better cured compositions than when the components are simply mixed in together at the same time. It is preferred that the mono-ol be used to form the predispersion since it is one of the more compatible components and usually has the lowest viscosity to start with, and therefore is most easily mixed. It is also quite possible to use the monohydroxylated epoxidized polymer to form the predispersion and also to use a mixture of the mono-ol and the polymer. However, the tackifying resin is usually chemically incompatible with the photoinitiator and it is essential that it not be present when dispersing the photoinitiator.

Radiation induced cationic curing may also be done in combination with free radical curing. Free radical curing can be further enhanced by the addition of additional free radical photoinitiators and photosensitizers.

The materials of the process of the present invention are useful in pressure sensitive adhesives and sealants (including packaging adhesives, contact adhesives, laminating adhesives, weatherable tapes, and assembly adhesives), and labels. It may be necessary for a formulator to combine a variety of ingredients together with the polymers of the present invention in order to obtain products having the proper combination of properties (such as adhesion, cohesion, durability, low cost, etc.) for particular applications. In most of these applications, suitable formulations would also contain various combinations of resins, plasticizers, fillers, solvents, stabilizers and other ingredients such as asphalt.

It is common practice to add an adhesion promoting or tackifying resin that is compatible with the polymer, generally from 20 to 400 parts per hundred parts of polymer. Unfortunately, many of the useful photoinitiators are incompatible with many of the available tackifying resins. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Adhesives are frequently thin layers of sticky compositions which are used in protected environments (adhering two substrates together). Therefore, unhydrogenated epoxidized polymers will usually have adequate stability so resin type and concentration will be selected for maximum stickiness without great concern for stability, and pigments will usually not be used.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated epoxidized polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

EXAMPLES

In the examples several adhesives tests are used to demonstrate the properties of test formulations using the improved binders of this invention. The degree of covalent cure obtained for each of the adhesive samples was measured by use of a polymer gel content test developed by J. R. Erickson for radiation curing adhesives, and first described in the article "Experimental Thermoplastic Rubbers for Enhanced Radiation Crosslinking of Hot Melt PSA's", TAPPI 1985 Hot Melt Symposium Proceedings, June 1985. The method as practiced for the present examples is essentially identical to the method as published, but for a few minor improvements and corrections to the method as first published. 180° Peel from polished steel was determined using Pressure Sensitive Tape Council Method No. 1. Large values indicate high strength when peeling a test tape from the substrate.

The polymer used herein is an epoxidized linear monohydroxy diene polymer of 6,000 molecular weight with the structure I-EB-OH (2000–4000 block MW) and 0.17 meq/g hydroxyl and 1.5 meq/g epoxy. The monol used herein is a linear monohydroxy diene polymer with a molecular weight of 3,000 and the structure EB—OH containing 0.33 meq/g hydroxyl. The incompatible photoinitiator discussed above was used. It is UVI 6974, a sulfonium salt cationic photoinitiator made by Union Carbide. The tackifier was Regalrez® 1085, a hydrogenated tackifying resin made by Hercules.

EXAMPLE 1

Previous adhesives comprised of the polymer, mono-ol, Regalrez 1085, and UVI 6974 would not UV cure unless mixed together with THF. This lack of cure was evident by lack of cohesion of the adhesive. Essentially the adhesive remained a viscous liquid (goo) and when one tried a finger tack test, adhesive would simply transfer to the finger. This performance is totally unacceptable. Our first attempt at forming UV cured adhesives by pre-dispersing the photoinitiator in the mono-ol and then adding the remaining components gave a well cured film showing no adhesive transfer in finger tack tests. Furthermore, the adhesive gave a 180 degree peel to steel value of 4.5 pli with no adhesive transfer. The adhesive was clearly well-cured in contrast to our previous experience when the photoinitiator was added to all the formulation components at the same time.

The success of adequately dispersing the photoinitiator can be assessed by visually observing the dispersion after the photoinitiator is stirred in. If droplets which are visible to the unaided eye are produced, the dispersion is not stable and phase separation occurs. Dispersions were also viewed with an optical microscope. Only if small droplets are formed can there be a stable dispersion and an effective UV cure; only then can useful adhesive properties be attained.

For this system, good dispersions were characterized by droplets of less than 20 microns with the bulk of the size distribution being between 1 and 10 microns.

The above components were individuals mixed with the photoinitiator to determine the level of dispersibility. The following table gives the conditions and the results.

| SYSTEM | TEMP. (°C.) | VISCOSITY (cP) | DISPERSIBILITY |
|---|---|---|---|
| Mono-ol + photoinitiator | 23 | 35,500 | good - small droplets with narrow distribution and long-term stability |
| Mono-ol + photoinitiator | 120 | 225 | good - small droplets with narrow distribution and long-term stability |
| Polymer + photoinitiator | 23 | 90,000 | good - small droplets with narrow distribution and long-term stability |
| Polymer + photoinitiator | 120 | 600 | good - small droplets with narrow distribution and long-term stability |
| Polymer + photoinitiator | 150 | 250 | good - small droplets with narrow distribution and long-term stability |
| Mono-ol + polymer + photoinitiator | 23 | 67,000 | good - small droplets with narrow distribution and long-term stability |
| Mono-ol + polymer + photoinitiator | 120 | 425 | good - small droplets with narrow distribution and long-term stability |
| Resin + photoinitiator | 120 | 4930 | poor - large, unstable droplets |
| Resin + photoinitiator | 165 | 350 | poor - large, unstable droplets |

The data in the table indicates that the dispersibility is dependent upon component chemical compatibility with the photoinitiator. Viscosity was not a factor. It was possible to disperse the photoinitiator in the mono-ol or the polymer at ambient or elevated temperature. It was not possible to produce a stable dispersion of photoinitiator in the resin, even when the resin was heated to temperatures which lowered its viscosity and thus made it easier to mix.

EXAMPLE 2

An adhesive formulation was formed by first dispersing the photoinitiator into monool. The formulation was comprised of 12.65 grams of the monool, 0.25 grams of the photoinitiator, 12.15 grams of the polymer, 24.8 grams of the tackifying resin, and 0.075 grams of the antioxidant Irganox® 1010. A film was prepared from the formulation by casting it at 125° C. and curing it with UV radiation. The 180° peel was 4.5 pounds with adhesive failure. The degree of cure, as measured by the gel content (the percentage of the binder polymers that are covalently attached to the three dimensional gel network), was 85%. This shows that a useful product was obtained. Other experiments wherein the components were simply mixed together did not produce a curable composition.

We claim:

1. A solvent free process for producing a UV curable adhesive or sealant composition comprising a monohydroxylated epoxidized polydiene block polymer comprised of at least two polymerizable ethenically unsaturated hydrocarbon monomers wherein at least one is a diene monomer which yields unsaturation suitable for epoxidation, and wherein the polymer contains from 0.1 to 7.0 milliequivalents of epoxy per gram of polymer, a low molecular weight polydiene monool, an insoluble photoinitiator, and a tackifying resin which is incompatible with the photoinitiator, said process comprising predispersing the photoinitiator in the monool or the polymer or a mixture of the two, and then adding the tackifying resin to the predispersion.

2. The process of claim 1 wherein the monohydroxylated epoxidized block polymer has the formula

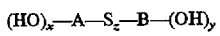

wherein A and B are polymer blocks which are homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1.

3. The process of claim 2 wherein the A blocks have a molecular weight of from 100 to 6000 and the B blocks have a molecular weight of from 1000 to 15,000.

4. The process of claim 2 wherein A is isoprene, B is butadiene, and S is styrene.

5. The process of claim 1 wherein the epoxidized monohydroxylated polydiene block polymer has the formula

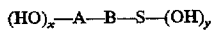

wherein A and B are polymer blocks which are homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1.

6. The process of claim 5 wherein the A blocks have a molecular weight of from 100 to 6000 and the B blocks have a molecular weight of from 1000 to 15,000.

7. The process of claim 5 wherein A is isoprene, B is butadiene, and S is styrene.

8. The process of claim 1 wherein the predispersion is formed by mixing the photoinitiator into the monool.

9. The process of claim 1 wherein the predispersion is formed by mixing the photoinitiator into the block polymer.

10. The process of claim 1 wherein the predispersion is formed by mixing the photoinitiator into a mixture of the monool and the block polymer.

* * * * *